Figure 1:
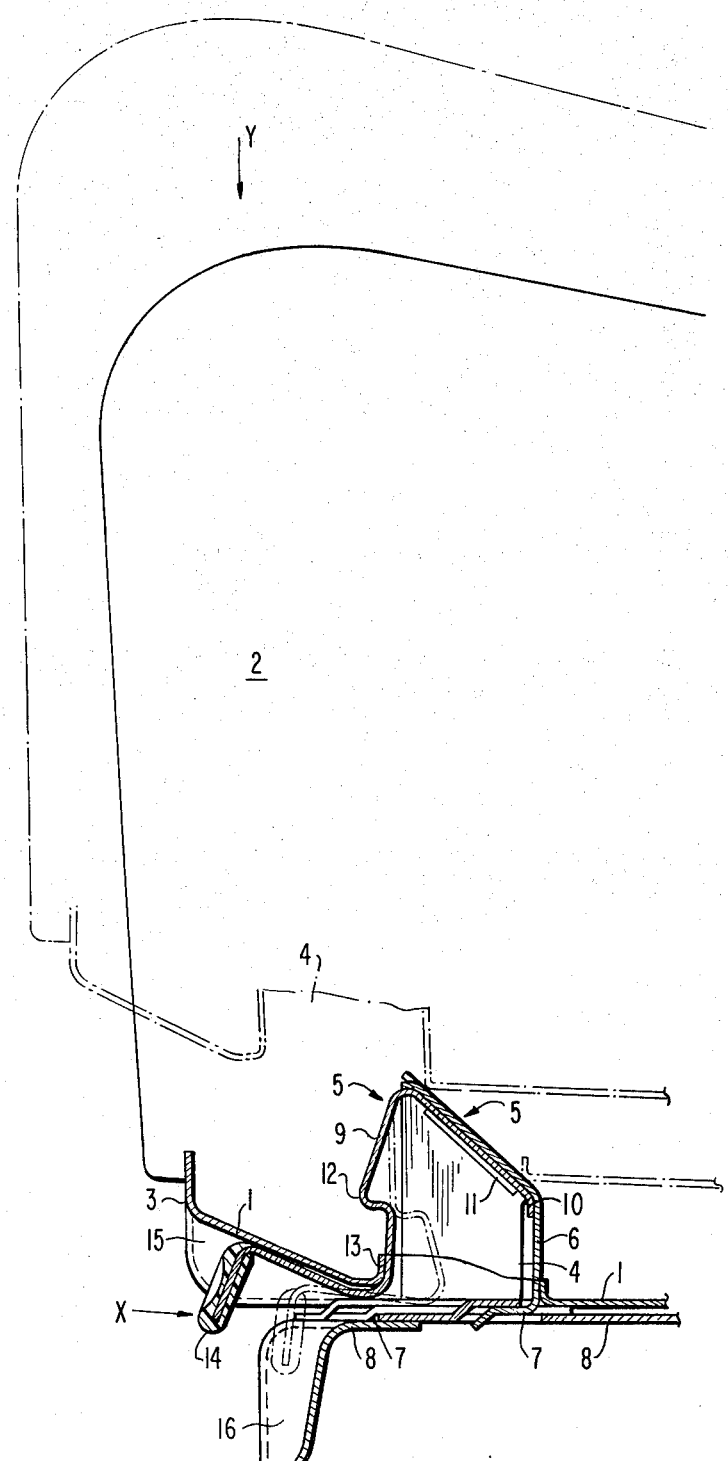

United States Patent [19]
Geier

[11] B 3,924,892
[45] Dec. 9, 1975

[54] INSTALLATION FOR DETACHABLE FASTENING OR REAR SEAT CUSHIONS IN PASSENGER MOTOR VEHICLES

[75] Inventor: Bernd Geier, Grafenau-Datzingen, Germany

[73] Assignee: Daimler-Benz Aktiengesellschaft, Germany

[22] Filed: Aug. 7, 1973

[21] Appl. No.: 386,403

[44] Published under the Trial Voluntary Protest Program on January 28, 1975 as document no. B 386,403.

[30] Foreign Application Priority Data
Aug. 8, 1972 Germany............................ 2238950

[52] U.S. Cl................. 297/440; 297/452; 296/28 C
[51] Int. Cl.².................... B60N 1/02; A47C 1/034
[58] Field of Search............. 180/89 A, 69 R, 69 G; 296/28 C, 65; 292/80, 81, 87–89; 297/60, 64, 92, 94, 93, 440, 445, 452

[56] References Cited
UNITED STATES PATENTS
| | | | |
|---|---|---|---|
| 1,232,931 | 7/1917 | Kilburn | 297/440 |
| 2,249,132 | 7/1941 | Haslam | 292/87 |
| 2,358,607 | 9/1944 | Tinnerman | 292/87 X |
| 2,755,846 | 7/1956 | Shepherdson | 297/440 UX |

FOREIGN PATENTS OR APPLICATIONS
210,144  11/1955  Australia........................... 296/65 R Primary Examiner—Casmir A. Nunberg
Attorney, Agent, or Firm—Craig & Antonelli

[57] ABSTRACT

An installation for the detachable fastening of the rear seat cushion of passenger motor vehicles, in which the sub-frame of the rear seat cushion is provided with recesses in proximity to its front edge; a retaining element which is inserted into a respective aperture of the seat cushion mounting, engages with its head portion in the corresponding recess during the lowering of the rear seat cushion onto the seat cushion mounting and adjusts the rear seat cushion into a correct position in which it is adapted to be automatically locked by means of a spring.

10 Claims, 2 Drawing Figures

U.S. Patent Dec. 9, 1975 3,924,892

INSTALLATION FOR DETACHABLE FASTENING OR REAR SEAT CUSHIONS IN PASSENGER MOTOR VEHICLES

The present invention relates to an installation for the detachable fastening of the rear seat cushion of passenger motor vehicles.

A widely used type of the fastening of a rear seat cushion consists in that the rear seat cushion is placed on a base support whereby a forward terminal strip or tongues projecting from the bottom side of the rear seat cushion and engaging in apertures of the base support are intended to prevent a displacement in the vehicle longitudinal direction, and in that subsequently the backrest is so arranged that its bottom side forces the rear end of the rear seat cushion downwardly. It may happen in case of an impact accident that the rear seat cushion jumps out of its forward mounting support and is thrown against the backrest of the front seat.

It is the aim of the present invention to provide a rear seat cushion anchoring system which offers a sufficient retention in all driving situations but which can be readily detached, for example, by manual actuation so that the storage space disposed below the rear seat cushion and particularly appropriate as regards a favorable weight distribution can be utilized. Consequently, an installation for the detachable fastening of the rear seat cushion of passenger motor vehicles is proposed whereby according to the present invention the sub-frame of the rear seat cushion is provided in proximity to its front edge with recesses into which engages a respective head portion of retaining elements inserted into apertures of the seat cushion mounting during the lowering of the rear seat cushion and adjusts the same into a positionally correct position adapted to be automatically locked by means of a spring.

In one preferred embodiment of the present invention, the spring may support itself with a bent end at the retaining element and may be connected therewith by tongues formed out of the head portion.

A secure latching can be achieved if each spring includes a nose-like projection which in the lowered condition of the rear seat cushion is engaged from below by the upwardly bent wall of the associated recess.

According to a further feature of the present invention, the sub-frame and the seat cushion mounting may be provided within the area of each retaining element with indentations for the free movability of the spring provided with a handle tab.

Accordingly, it is an object of the present invention to provide an installation for the detachable fastening of the rear seat cushion of passenger motor vehicles which avoids by simple means the aforementioned shortcomings and drawbacks encountered in the prior art.

Another object of the present invention resides in an installation for the detachable fastening of the rear seat cushion of passenger motor vehicles which greatly increases the passenger safety in case of accident by assuring a secure locking of the seat in the desired position.

A further object of the present invention resides in an installation for the detachable fastening of the rear seat cushion of passenger motor vehicles which not only offers a sufficient retention under all driving situations but permits ready access to the storage space disposed below the rear seat cushion.

A still further object of the present invention resides in an installation for the detachable fastening of rear seat cushions of passenger motor vehicles which enables a safe locking of the seat cushion in the correct position yet permits an easy disengagement if so desired.

Figure 2:
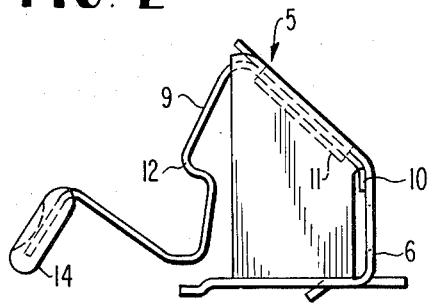

These and further objects, features and advantages of the present invention will become more apparent from the following description when taken in connection with the accompanying drawing which shows, for purposes of illustration only, one embodiment in accordance with the present invention, and wherein:

FIG. 1 is a partial side elevational view, partly in cross section, of an installation for the detachable fastening of a rear seat cushion in accordance with the present invention, showing the same in its two extreme positions, and FIG. 2 is an elevational view of the installation according to FIG. 1 as separate structural part.

Referring now to the drawing wherein like reference numerals are used throughout the two views to designate like parts, the sub-frame 1 of the rear seat cushion 2 is provided in proximity to its forward edge 3 with recesses 4 into which engages a head portion generally designated by reference numeral 5 of a retaining and locking element 6. The retaining and locking element 6 is inserted into apertures 7 of the seat cushion mounting 8—which may be constructed as vehicle cross bearer—and is provided with a spring 9 whose bent-off end is supported at the retaining and locking element 6 and which is secured by tabs or tongues 11 formed out of the head portion 5. Furthermore, the spring 9 includes a nose-like projection 12 which is engaged from below by the upwardly bent wall 13 of the associated recess 4 when the rear seat cushion 2 rests on the seat cushion mounting 8. This latching arrangement can be readily disengaged in that the spring 9 provided with a handle tab 14 is forced in the direction of the arrow "X" (FIG. 1) up to into the position indicated in dash and dot lines. Depending on the construction of the sub-frame 1 and of the seat cushion mounting 8 both parts are provided with indentations 15 and 16 in order that the spring 9 can be pressed-in unobstructedly.

The installation of the rear seat cushion 2 takes place in that the latter is placed in a manner not illustrated in the drawing against the front side of the rear backrest and is emplaced so as to come to rest on the head portion 5 of the associated retaining and locking element 6. If one now presses down in the direction of the arrow "Y" indicated in FIG. 1, then the recess 4 slides along the head portion 5 and centers together with the same. As soon as the forward wall 13 of the recess 4 encounters the spring 9, the same is displaced until the rear seat cushion 2 has been lowered so far that the nose-like projection 12 of the spring 9 is engaged from below by the wall 13. In this position the rear seat cushion 2 is secured against any displacement.

If the storage space 17 is to be utilized which is disposed underneath the rear seat cushion 2 then the rear seat cushion 2 can be readily disengaged and folded up by pressing-in the spring 9 in the manner already described.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What I claim is:

1. An installation for detachable fastening of a rear seat cushion means, characterized in that a rear seat mounting means is provided, aperture means are provided in the rear seat mounting means, the rear seat cushion means includes a sub-frame which is provided in proximity to its forward edge with recess means, a retaining means is fixed at the rear seat mounting means and includes a head portion engaging in the recess means during the lowering of the rear seat cushion means and a base portion inserted into said aperture means provided in the rear seat mounting means, the retaining means adjusting the rear seat cushion means into a position correct as regards its location on the rear seat mounting means when the rear seat is lowered, and a spring means is provided having one bent portion on said retaining means for automatically latching the rear seat cushion means when lowered on the retaining means.

2. An installation for the detachable fastening of a rear seat cushion means of passenger motor vehicles, characterized in that the rear seat cushion means includes a sub-frame which is provided in proximity to its forward edge with recess means, the head portion of a retaining means fixed at a seat cushion mounting means engaging in the recess means during the lowering of the rear seat cushion, said retaining means including a spring means and adjusting the rear seat cushion into a position correct as regards its location and adapted to be automatically latched by the spring means, and nd characterized in that the retaining means are inserted into aperture means of the seat cushion mounting means.

3. An installation according to claim 2, characterized in that the spring means is supported with a bent end at the retaining means and is operatively connected therewith by tongue means formed out of a respective head portion.

4. An installation for the detachable fastening of a rear seat cushion means of passenger motor vehicles, characterized in that the rear seat cushion means includes a sub-frame which is provided in proximity to its forward edge with recess means, the head portion of a retaining means fixed at a seat cushion mounting means engaging in the recess means during the lowering of the rear seat cushion, said retaining means including a spring means and adjusting the rear seat cushion into a position collect as regards its location and adapted to be automatically latched by the spring means, the retaining means are inserted into aperture means of the seat cushion mounting means, the spring means is supported with a bent end at the retaining means and is operatively connected therewith by tongue means formed out of a respective head portion, and characterized in that each spring means includes a nose-like projection which is engaged from below in the lowered condition of the rear seat cushion means by the upwardly bent wall of the associated recess means.

5. An installation according to claim 4, characterized in that the sub-frame means and the seat cushion mounting means are provided with indentations within the area of each retaining means for the free movability of the spring means provided with a handle.

6. An installation according to claim 1 characterized in that the spring means is operatively connected with the retaining means by tongue means formed out of a respective head portion.

7. An installation according to claim 1, characterized in that each spring means includes a nose-like projection which is engaged from below in the lowered condition of the rear seat cushion means by the upwardly bent wall of the associated recess means.

8. An installation according to claim 7, characterized in that the spring means is supported with a bent end at the retaining means and is operatively connected therewith by tongue means formed out of a respective head portion.

9. An installation for the detachable fastening of a rear seat cushion means of passenger motor vehicles, characterized in that the rear seat cushion means includes a sub-frame which provided in proximity to its forward edge with recess means, the head portion of a retaining means fixed at a seat cushion mounting engaging in the recess means during the lowering of the rear seat cushion, said retaining means including a spring means and adjusting the rear seat cushion into a position correct as regards its location and adapted to be automatically latched by the spring means, and characterized in that the sub-frame means and the seat cushion mounting means are provided with indentations within the area of each retaining means for the free movability of the spring means provided with a handle.

10. An installation according to claim 9, characterized in that each spring means includes a nose-like projection which is engaged from below in the lowered condition of the rear seat cushion means by the upwardly bent wall of the associated recess means.

* * * * *